US012080214B2

(12) United States Patent
Zhang

(10) Patent No.: US 12,080,214 B2
(45) Date of Patent: Sep. 3, 2024

(54) DISPLAY PANEL, DRIVE CIRCUIT AND DISPLAY DEVICE

(71) Applicant: Wuhan Tianma Microelectronics Co., Ltd., Wuhan (CN)

(72) Inventor: Di Zhang, Wuhan (CN)

(73) Assignee: WUHAN TIANMA MICROELECTRONICS CO., LTD., Wuhan (CN)

(*) Notice: Subject to any disclaimer, the term of this patent is extended or adjusted under 35 U.S.C. 154(b) by 0 days.

(21) Appl. No.: 18/121,605

(22) Filed: Mar. 15, 2023

(65) Prior Publication Data

US 2024/0221570 A1 Jul. 4, 2024

(30) Foreign Application Priority Data

Dec. 29, 2022 (CN) ......................... 202211718594.0

(51) Int. Cl.
*G09G 3/20* (2006.01)
*G09G 3/32* (2016.01)

(52) U.S. Cl.
CPC ............. *G09G 3/2003* (2013.01); *G09G 3/32* (2013.01); *G09G 2300/0452* (2013.01); *G09G 2310/061* (2013.01); *G09G 2320/0242* (2013.01)

(58) Field of Classification Search
CPC ................... G09G 3/32; G09G 3/3233; G09G 2300/0809; G09G 2300/0814; G09G 2300/0819; G09G 2300/0861; G09G 2310/0262; G09G 2310/08; G09G 2320/0204; G09G 2330/021; G09G 2330/025; G09G 2330/027;
(Continued)

(56) References Cited

U.S. PATENT DOCUMENTS

| | | | | |
|---|---|---|---|---|
| 2019/0252479 A1* | 8/2019 | Kang | ................. | H10K 59/1216 |
| 2021/0319744 A1* | 10/2021 | Lee | .......................... | G09G 3/32 |
| 2023/0290307 A1* | 9/2023 | Shin | ......................... | G09G 3/32 |

FOREIGN PATENT DOCUMENTS

| | | |
|---|---|---|
| CN | 110223633 A | 9/2019 |
| CN | 111009218 A | 4/2020 |
| CN | 112785956 A | 5/2021 |

(Continued)

OTHER PUBLICATIONS

English translation of WO 2023011474 A1 (Year: 2021).*

*Primary Examiner* — Nelson M Rosario
(74) *Attorney, Agent, or Firm* — East IP P.C.

(57) ABSTRACT

This application discloses a display panel including pixel circuits and light-emitting elements, wherein a first pixel circuit includes a first reset module that is connected to a first light-emitting element and provides a first reset signal to the first light-emitting element under a condition that the first reset module is turned on; a second pixel circuit includes a second reset module that is connected to a second light-emitting element and provides a second reset signal to the second light-emitting element under a condition that the second reset module is turned on; a data writing period of the pixel circuits includes a data writing phase and one or more holding phases; at least one holding phase includes a first reset sub-phase in which the first and second reset modules are turned on, voltages of the first and second reset signals are Vref21 and Vref22 respectively, and Vref21≠Vref22.

20 Claims, 9 Drawing Sheets

(58) Field of Classification Search
CPC ........... G09G 2330/04; G09G 2330/10; G09G 2330/12; H01L 25/167; H01L 25/0753; H01L 33/20
See application file for complete search history.

(56) References Cited

FOREIGN PATENT DOCUMENTS

| | | | | |
|---|---|---|---|---|
| CN | 114566127 | A | | 5/2022 |
| WO | WO-2023011474 | A1 | * | 2/2023 |

* cited by examiner

DISPLAY PANEL, DRIVE CIRCUIT AND DISPLAY DEVICE

CROSS-REFERENCE TO RELATED APPLICATION

This application is based on and claims priority to Chinese Patent Application No. 202211718594.0, filed on Dec. 29, 2022 and titled "DISPLAY PANEL, DRIVE CIRCUIT AND DISPLAY DEVICE", which is incorporated herein by reference in its entirety.

TECHNICAL FIELD

The present application relates to the technical field of display, and in particular, to a display panel, a drive circuit and a display device.

BACKGROUND

A display panel may include light-emitting elements emitting light of different colors, for example, the display panel includes a light-emitting element R emitting red light, a light-emitting element G emitting green light and a light-emitting element B emitting blue light. The R, G and B may be controlled to emit light together, and the R, G and B may emit white light in an appropriate luminance ratio.

However, the inventors have found that in a low-luminance mode, when the display panel switches between a black picture and a white picture, the white picture has a color cast phenomenon.

SUMMARY

Embodiments of the present application provide a display panel, a drive circuit and a display device.

In a first aspect, embodiments of the present application provide a display panel including pixel circuits and light-emitting elements, wherein the pixel circuits include a first pixel circuit and a second pixel circuit, the light-emitting elements include a first light-emitting element and a second light-emitting element, and a light-emitting color of the first light-emitting element and a light-emitting color of the second light-emitting element are different; the first pixel circuit includes a first reset module, wherein the first reset module is connected to the first light-emitting element, and provides a first reset signal to the first light-emitting element under a condition that the first reset module is turned on; the second pixel circuit includes a second reset module, wherein the second reset module is connected to the second light-emitting element, and provides a second reset signal to the second light-emitting element under a condition that the second reset module is turned on; a data writing period of the pixel circuits includes a data writing phase and one or more holding phases; at least one of the holding phases includes a first reset sub-phase, wherein in the first reset sub-phase, the first reset module and the second reset module are turned on, a voltage of the first reset signal is Vref21, a voltage of the second reset signal is Vref22, and Vref21≠Vref22.

Based on the same inventive concept, in a second aspect, embodiments of the present application provide a drive circuit for providing a signal to the display panel provided by the first aspect of embodiments described above. The display panel includes pixel circuits and light-emitting elements, wherein the pixel circuits include a first pixel circuit and a second pixel circuit, the light-emitting elements include a first light-emitting element and a second light-emitting element, and a light-emitting color of the first light-emitting element and a light-emitting color of the second light-emitting element are different. The first pixel circuit includes a first reset module, wherein the first reset module is connected to the first light-emitting element, and provides a first reset signal to the first light-emitting element under a condition that the first reset module is turned on. The second pixel circuit includes a second reset module, wherein the second reset module is connected to the second light-emitting element, and provides a second reset signal to the second light-emitting element under a condition that the second reset module is turned on.

A data writing period of the pixel circuits includes a data writing phase and one or more holding phases. At least one of the holding phases includes a first reset sub-phase, wherein in the first reset sub-phase, the first reset module and the second reset module are turned on, and the drive circuit provides a first reset signal and a second reset signal, a voltage of the first reset signal is Vref21, a voltage of the second reset signal is Vref22, and Vref21≠Vref22.

Based on the same inventive concept, in a third aspect, embodiments of the present application provide a display device including the display panel provided by the first aspect of embodiments described above.

BRIEF DESCRIPTION OF THE DRAWINGS

Other features, objects, and advantages of the present application will become more apparent from the following detailed description of non-limiting embodiments with reference to the drawings, wherein same or similar reference numbers refer to same or similar features, and the drawings are not drawn to an actual scale.

DETAILED DESCRIPTION

Figure 1:
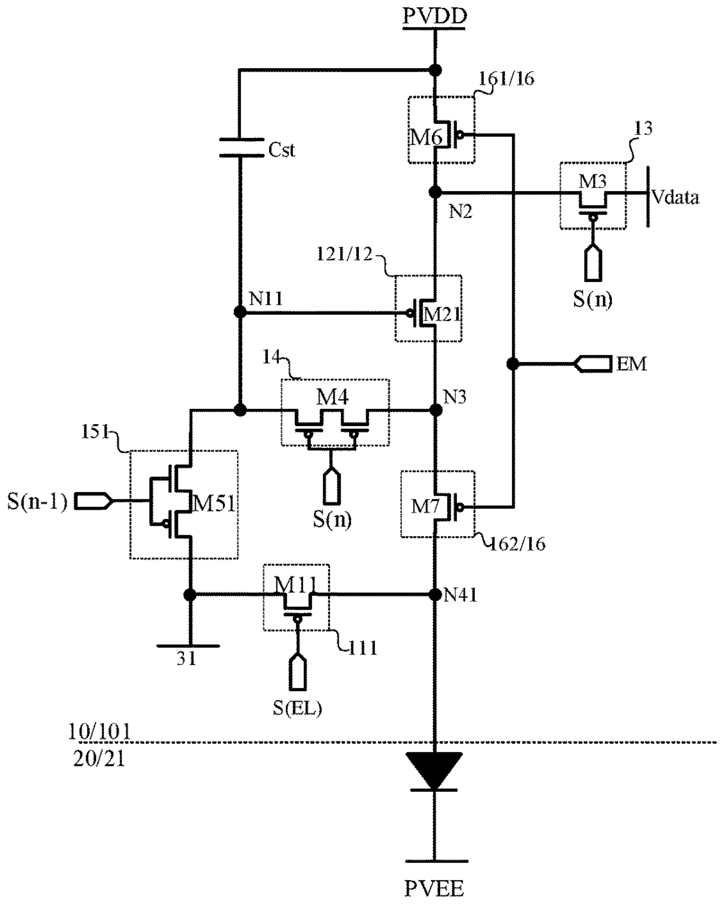
FIG. 1 illustrates a schematic diagram of a structure of a first pixel circuit in a display panel according to an embodiment of the present application.

Features and exemplary embodiments of various aspects of the present application will be described in detail below, and in order to make objects, technical solutions and advantages of the present application more clear and apparent, the present application is further described in detail below in conjunction with the drawings and specific embodiments. It should be understood that specific embodiments described herein are only configured to interpret the present application, and are not configured to limit the present application. For those skilled in the art, the present application may be practiced without some of these specific details. The following description of embodiments is only intended to provide a better understanding of the present application by illustrating examples of the present application.

It should be noted that, relational terms herein such as "first" and "second", and the like, are only used to distinguish one entity or operation from another entity or operation, and do not necessarily require or imply any such actual relationship or order between these entities or operations. Furthermore, terms "comprising", "including", or any other variation thereof, are intended to cover a non-exclusive inclusion, such that a process, method, article, or apparatus including a series of elements includes not only those elements, but also other elements not expressly listed or elements inherent to such process, method, article, or apparatus. Without further restrictions, an element qualified by "comprises . . . " does not exclude an existence of additional identical elements in the process, method, article, or apparatus that comprises the element.

It should be understood that when describing a structure of a component, under a condition that one layer or region is referred to as being located "on" or "over" another layer or region, it may mean that the layer or region is directly located on another layer or region or that there are other layers or regions between the layer or region and another layer or region. Also, if the component is flipped, the layer or region will be located "under" or "below" another layer or region.

It should be understood that the term "and/or" as used herein is only an association relationship to describe associated objects, and means that there may be three relationships. For example, A and/or B may represent three cases: A alone, both A and B, and B alone. In addition, the character "/" as used herein generally indicates that associated objects are of an "or" relationship.

In embodiments of the present application, the term "connected" may mean that two components are directly connected, or that two components are connected via one or more other components. The "connection" in the present application may be an electrical connection, for example, a direct electrical connection or an electrical connection via a structure such as a transistor.

It will be apparent to those skilled in the art that various modifications and variations can be made in the present application without departing from the spirit or scope of the present application. Thus, the present application is intended to cover modifications and variations of the present application falling within the scope of corresponding claims (technical solutions for which protection is claimed) and their equivalents. It should be noted that implementations provided in embodiments of the present application can be combined with each other without contradiction.

Before explaining technical solutions provided in embodiments of the present application, in order to facilitate the understanding of embodiments of the present application, the present application first specifically describes problems existing in the related art:

As described above, in a low-luminance mode, when the display panel switches between a black picture and a white picture, the white picture has a color cast phenomenon.

In order to solve the above-mentioned technical problems, the inventors of the present application first conducted research and analysis on root causes leading to the above-mentioned technical problems, and the specific research and analysis process is as follows:

A pixel circuit may be provided in the display panel to drive a light-emitting element to emit light, and specifically, a drive transistor in the pixel circuit can generate a drive current based on a received data signal, and the light-emitting element emits corresponding light in response to the drive current generated by the drive transistor. However, due to a hysteresis effect of the drive transistor, the drive current of the light-emitting element is low in a first frame, and the white picture cannot reach a normal luminance in the first frame. Furthermore, due to different characteristics of material systems of different light-emitting elements themselves, different light-emitting elements have different difficulty degrees in reaching a normal luminance in the first frame, that is, light-emitting elements of different colors have different differences between a luminance of the first frame and a target luminance thereof, resulting in a color cast phenomenon in the white picture of the first frame.

In view of the above studies of the inventors, it has been found that embodiments of the present application provide a display panel, a drive circuit and a display device, which are advantageous in improving the color cast phenomenon of the display panel. Technical solutions in embodiments of the present application will be described clearly and completely below with reference to the drawings in embodiments of the present application.

Figure 2:
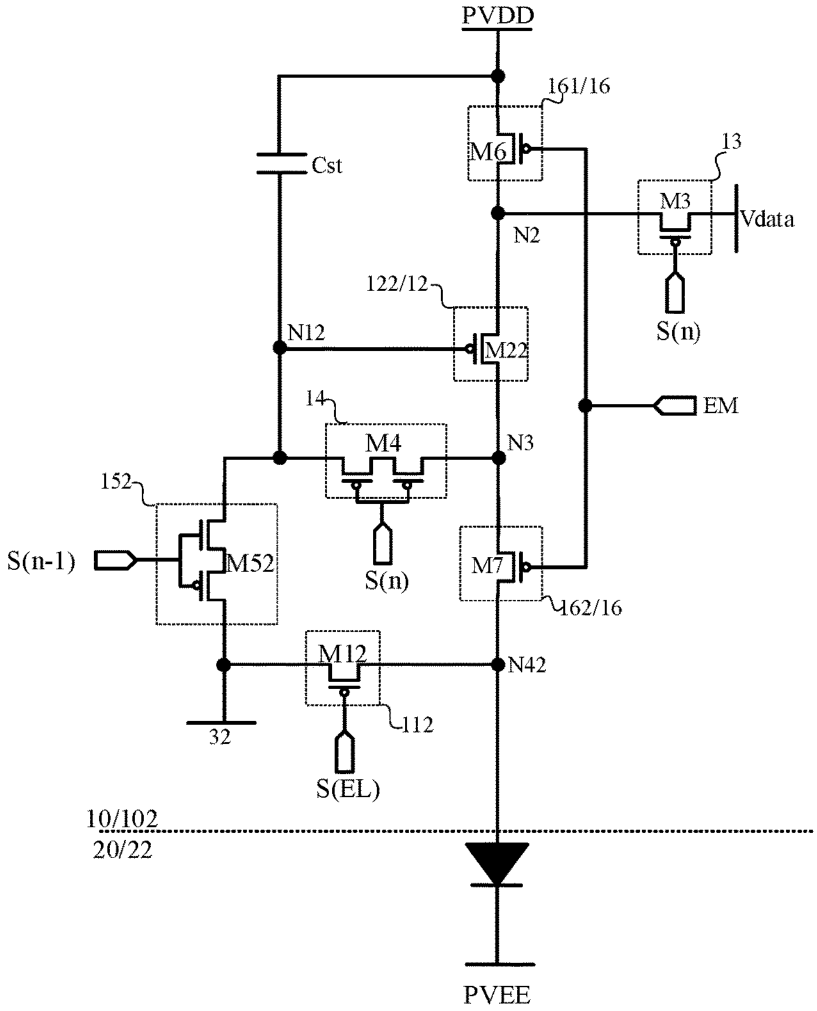
FIG. 2 illustrates a schematic diagram of a structure of a second pixel circuit in a display panel according to an embodiment of the present application.

FIG. 1 illustrates a schematic diagram of a structure of a first pixel circuit in a display panel according to an embodiment of the present application. FIG. 2 illustrates a schematic diagram of a structure of a second pixel circuit in a display panel according to an embodiment of the present application. As shown in FIGS. 1 and 2, the display panel may include pixel circuits 10 and light-emitting elements 20. The light-emitting elements 20 include, but are not limited to, an Organic Light-Emitting Diode (OLED).

The pixel circuits 10 may include a first pixel circuit 101 and a second pixel circuit 102. The light-emitting elements 20 may include a first light-emitting element 21 and a second light-emitting element 22. A light-emitting color of the first light-emitting element 21 and a light-emitting color of the second light-emitting element 22 are different. As one example, the first light-emitting element 21 may be a light-emitting element that emits green light, and the second light-emitting element 22 may be a light-emitting element that emits red light or a light-emitting element that emits blue light.

Figure 3:
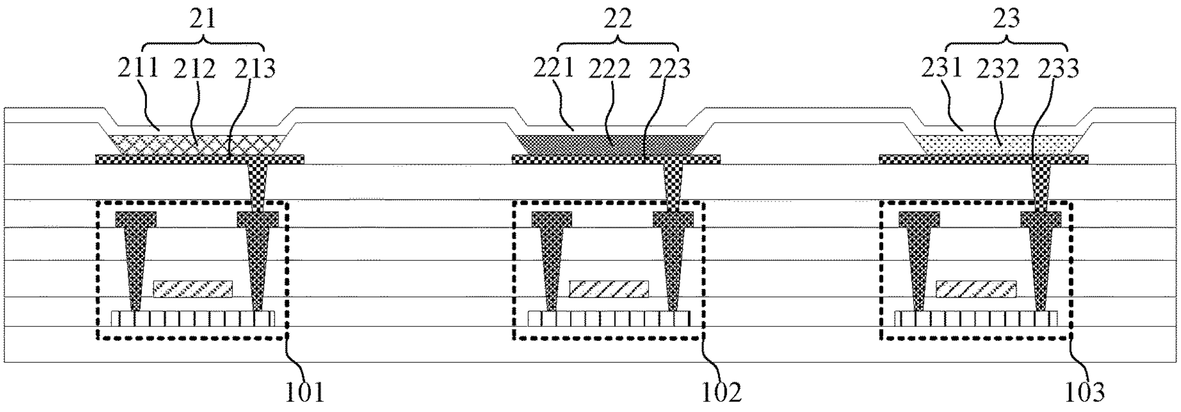
FIG. 3 illustrates a schematic cross-sectional view of a display panel according to an embodiment of the present application.

As shown in FIG. 3, an organic material layer 212 is included between a cathode 211 and an anode 213 of the first light-emitting element 21, an organic material layer 222 is included between a cathode 221 and an anode 223 of the second light-emitting element 22, and a material of the organic material layer 212 of the first light-emitting element 21 and a material of the organic material layer 222 of the second light-emitting element 22 may be different. FIG. 3 further illustrates a third light-emitting element 23 and a third pixel circuit 103, an organic material layer 232 is included between a cathode 231 and an anode 233 of the third light-emitting element 23, and the material of the organic material layer 212 of the first light-emitting element 21, the material of the organic material layer 222 of the second light-emitting element 22 and a material of the organic material layer 232 of the third light-emitting element 23 may all be different.

Referring to FIG. 1, the first pixel circuit 101 may include a first reset module 111, wherein the first reset module 111 is connected to the first light-emitting element 21, and provides a first reset signal to the first light-emitting element 21 under a condition that the first reset module 111 is turned on. Illustratively, one end of the first reset module 111 may be connected to a first reset signal terminal 31, which may be configured to provide a first reset signal, and the other end of the first reset module 111 may be connected to the anode of the first light-emitting element 21 at a node N41. The first reset module 111 may be turned on or off under the control of a first scanning signal S(EL), and under a condition that the first scanning signal S(EL) controls the first reset module 111 to be turned on, the first reset module 111 can transmit the first reset signal provided by the first reset signal terminal 31 to the anode of the first light-emitting element 21 so as to reset the anode of the first light-emitting element 21.

As an example, the first reset module 111 may include a first transistor M11, a gate electrode of the first transistor M11 may receive the first scanning signal S(EL). A first electrode of the first transistor M11 may be connected to the first reset signal terminal 31, and a second electrode of the first transistor M11 is connected to the anode of the first light-emitting element 21 at the node N41. The first scanning signal S(EL) is a pulse signal, and the first transistor M11 is controlled to be turned on or off through a high or low level of the pulse signal.

Referring to FIG. 2, the second pixel circuit 102 may include a second reset module 112, wherein the second reset module 112 is connected to the second light-emitting element 22, and provides a second reset signal to the second light-emitting element 22 under a condition that the second reset module 112 is turned on. Illustratively, one end of the second reset module 112 may be connected to a second reset signal terminal 32, which may be configured to provide a second reset signal, and the other end of the second reset module 112 may be connected to the anode of the second light-emitting element 22 at a node N42. The second reset module 112 may be turned on or off under the control of the first scanning signal S(EL), and under a condition that the first scanning signal S(EL) controls the second reset module 112 to be turned on, the second reset module 112 can transmit the second reset signal provided by the second reset signal terminal 32 to the anode of the second light-emitting element 22 so as to reset the anode of the second light-emitting element 22.

As an example, the second reset module 112 may include a second transistor M12, a gate electrode of the second transistor M12 may receive the first scanning signal S(EL). A first electrode of the second transistor M12 may be connected to the second reset signal terminal 32, and a second electrode of the second transistor M12 is connected to the anode of the second light-emitting element 22 at the node N42. The first scanning signal S(EL) is a pulse signal, and the second transistor M12 is controlled to be turned on or off through a high or low level of the pulse signal.

As shown in FIG. 1 or FIG. 2, the pixel circuits 10 may further include a drive module 12, a data writing module 13, a threshold compensation module 14, light-emitting control modules 16, and a storage capacitor Cst. For the convenience of differentiation, the drive module 12 of the first pixel circuit 101 is referred to herein as a first drive module 121, and the drive module 12 of the second pixel circuit 102 is referred to herein as a second drive module 122. The first drive module 121 of the first pixel circuit 101 may include a drive transistor M21, the second drive module 122 of the second pixel circuit 102 may include a drive transistor M22, the data writing module 13 may include a transistor M3, and the threshold compensation module 14 may include a transistor M4. The light-emitting control modules 16 may include a first light-emitting control module 161 and a second light-emitting control module 162, the first light-emitting control module 161 may include a transistor M6, the second light-emitting control module 162 may include a transistor M7. PVDD represents a first power supply signal, and PVEE represents a second power supply signal. The manner in which the modules and elements are connected is described with reference to FIG. 1 and will not be described in detail herein. Illustratively, the first power supply signal PVDD may be a positive voltage signal and the second power supply signal PVEE may be a negative voltage signal. Voltage values of the second power supply signal PVEE in different display modes may be different, and for example, the display modes may include an Always On Display (AOD) display mode, a high refresh frequency mode, a low refresh frequency mode or other display modes, etc. Illustratively, a voltage of the second power supply signal PVEE may vary between −2V and −3V.

Continuing to refer to FIG. 1 or FIG. 2, the data writing module 13 may be turned on or off under the control of a second scanning signal S(n), and under a condition that the data writing module 13 is turned on, a data signal Vdata is transmitted to a node N2 via the data writing module 13. The threshold compensation module 14 may also be turned on or off under the control of the second scanning signal S(n), and under a condition that the threshold compensation module 14 is turned on, the data signal Vdata at the node N2 is transmitted to nodes Nl1 and N12, and the threshold compensation module 14 compensates a threshold voltage of the drive transistor M3. The light-emitting control modules 16 may be turned on or off under the control of a light-emitting control signal EM, and under a condition that the light-emitting control module 16 is turned on, the drive module 12 of the pixel circuits 10 may provide a corresponding drive current to the light-emitting elements 20 based on a received data signal, so that the light-emitting elements 20 emit light, and a light-emitting luminance of the light-emitting elements 20 may be related to the drive current provided by the drive module 12.

Figure 4:
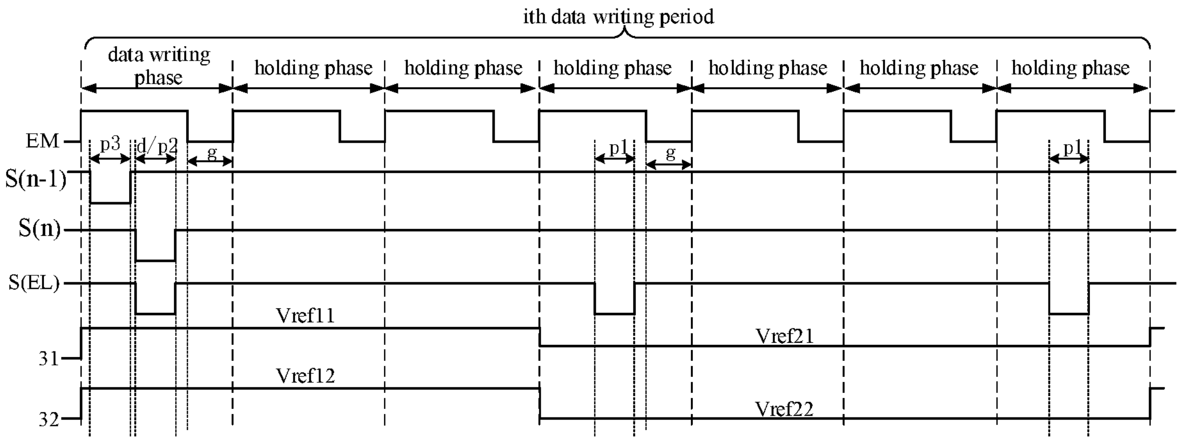
FIG. 4 illustrates a timing schematic diagram for a pixel circuit in a display panel according to an embodiment of the present application.

As shown in FIG. 4, a data writing period of the pixel circuits 10 may include a data writing phase and one or more holding phases. The data writing period may include a plurality of holding phases, and a number of holding phases is schematically shown in FIG. 4 as 6, which is not intended to limit the present application.

At least one of the holding phases may include a first reset sub-phase p1, wherein in the first reset sub-phase p1, the first scanning signal S(EL) is a turn-on level, the first reset module 111 and the second reset module 112 are turned on, a voltage of the first reset signal is Vref21, a voltage of the second reset signal is Vref22, and Vref21≠Vref22.

During an operation process of the pixel circuits, the first reset signal and the second reset signal may always be negative voltages, and therefore Vref21 and Vref22 in embodiments of the present application may be negative voltage values, and Vref23, Vref11, Vref12 and Vref13 described later may all be negative voltage values.

The data writing period may be determined based on a minimum period for writing the data signal Vdata to a gate electrode of the drive transistor M3. The data signal Vdata may be written to the gate electrode of the drive transistor M3 once in a data writing period. In other words, in a data writing period, a data writing sub-phase is included, and in the data writing sub-phase, the data writing module 13 and the threshold compensation module 14 are turned on once at the same time, to transmit the data signal Vdata to the gate electrode of the drive transistor.

The data writing phase may include a data writing sub-phase d, and in the data writing sub-phase d, the data writing module 13 and the threshold compensation module 14 are turned on and the data signal Vdata may be written to the gate electrode of the drive transistor M3. The holding phases do not include a data writing sub-phase d, and in the holding phases, the data signal Vdata is not written to the gate electrode of the drive transistor M3. In the data writing phase and each holding phase, a light-emitting sub-phase g may be included, and in the light-emitting sub-phase g, the light-emitting control signal EM is a turn-on level, for example, the light-emitting control signal EM is a low level, the light-emitting control module 16 is turned on, the drive current generated by the drive module 12 is transmitted to the light-emitting elements 20, and the light-emitting elements 20 emit light. It is understood that the first reset sub-phase p1 precedes the light emitting sub-phase g in the holding phase to which the first reset sub-phase p1 belongs. Alternatively, in the holding phase to which the first reset sub-phase p1 belongs, under a condition that the first scanning signal S(EL) is a turn-on level, the light-emitting control signal EM is a cut-off level.

When a light-emitting element emits light, an anode of the light-emitting element needs to be raised from a voltage of a reset signal to a power-on voltage, and a process of raising the voltage of the reset signal to the power-on voltage may be understood as a charging process of the anode. The greater the voltage of the reset signal, the easier it is for the anode of the light-emitting element to be charged to the power-on voltage, and the easier it is for the light-emitting element to emit light. Conversely, the smaller the voltage of the reset signal is, the less likely it is for the anode of the light-emitting element to be charged to the power-on voltage, and the less likely it is for the light-emitting element to emit light. In embodiments of the present application, the anode of the first light-emitting element and the anode of the second light-emitting element are respectively reset with different voltages in the first reset sub-phase, so that a difficulty degree of charging the anode of the first light-emitting element and a difficulty of charging the anode of the second light-emitting element are different, and thus a light-emitting difficulty degree of the first light-emitting element and a light-emitting difficulty degree of the second light-emitting element are different. Therefore, in the first reset sub-phase, the anode of the first light-emitting element and the anode of the second light-emitting element are respectively reset with different voltages, so that light-emitting difficulty degrees of different light-emitting elements can be adjusted, and thus luminance of different light-emitting elements can be adjusted, which can help to improve the color cast phenomenon.

In addition, when the light-emitting elements emit light, transistors of the first reset module and the second reset module do not turn off completely, that is, there is a leakage current, and the greater a voltage difference across each of the transistors, the greater the leakage current will be, and an anode potential of the light-emitting element will be pulled down. In embodiments of the present application, by differentially designing a voltage of a reset signal, leakage degrees corresponding to different light-emitting elements can be adjusted, and thus the luminance of different light-emitting elements can be adjusted, so that the color cast phenomenon can also be improved.

In embodiments of the present application, an ith data writing period may correspond to a first frame of a picture, and thus embodiments of the present application can adjust the luminance of different light-emitting elements in the first frame, which can help to improve the color cast phenomenon in the first frame.

The inventors have also found that an anode and a cathode of a light-emitting element may be equivalent to two plates of a capacitor, an organic material of the light-emitting element may be equivalent to a medium between capacitor plates, organic materials of different light-emitting elements are different, that is to say, equivalent capacitances of different light-emitting elements are different, and the greater the equivalent capacitance of the light-emitting element is, the greater an effect of a change in the drive current on the light-emitting element. For example, under a condition that a capacitance of an organic material of a light-emitting element G that emits green light is the largest, an equivalent capacitance of the light-emitting element G that emits green light is the largest, and an effect of a drive current change on the light-emitting element G that emits green light in the first frame is the largest, resulting in that a luminance of the light-emitting element G that emits green light in the first frame is the lowest, thereby resulting in a phenomenon that a color of a white picture is purple.

Alternatively, in the case where the first light-emitting element 21 emits green light and the second light-emitting element 22 emits blue light or red light, Vref21>Vref22 may be set. From another perspective, in the case where an equivalent capacitance of the first light-emitting element 21 is greater than an equivalent capacitance of the second light-emitting element 22, Vref21>Vref22.

Thus, in at least one of the holding phases, the first light-emitting element 21 is easier to be charged to the power-on voltage, the first light-emitting element 21 is easier to emit light, and a leakage degree corresponding to the first light-emitting element 21 is smaller, thereby contributing to improve a luminance of the first light-emitting element 21 and improve the color cast phenomenon.

Figure 5:
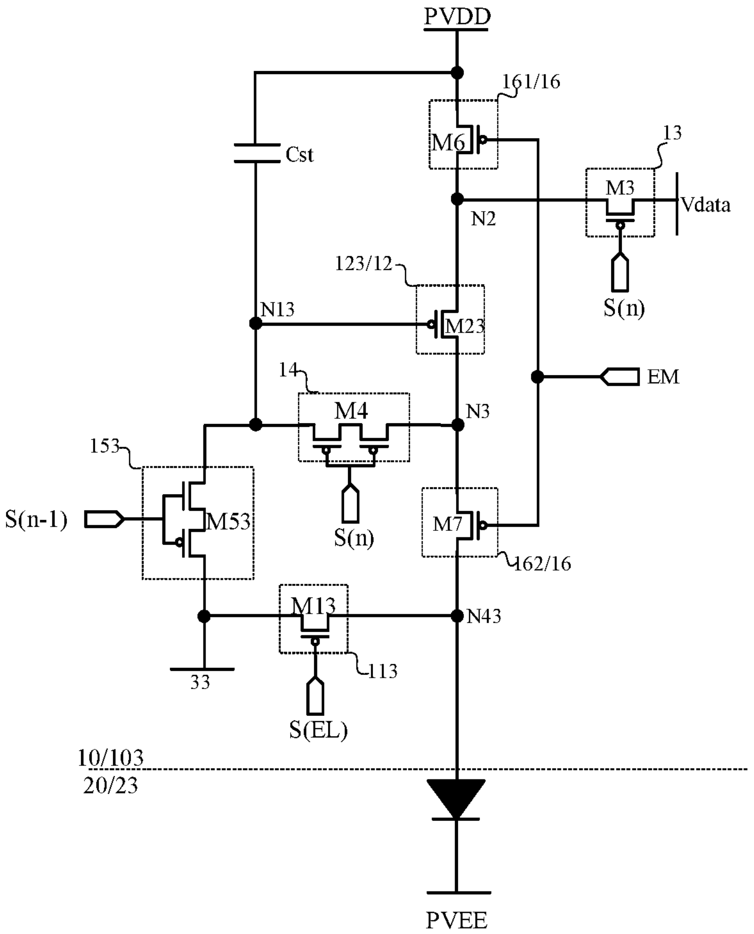
FIG. 5 illustrates a schematic diagram of a structure of a third pixel circuit in a display panel according to an embodiment of the present application.

In some embodiments, as shown in FIG. 5, the pixel circuits 10 further include a third pixel circuit 103, and the light-emitting elements 20 further include a third light-emitting element 23. The first light-emitting element 21, the second light-emitting element 22, and the third light-emitting element 23 each have a different light-emitting color. As one example, the first light-emitting element 21 may be a light-emitting element that emits green light, the second light-emitting element 22 may be a light-emitting element that emits blue light, and the third light-emitting element 23 may be a light-emitting element that emits red light.

The third pixel circuit 103 includes a third reset module 113, wherein the third reset module 113 is connected to the third light-emitting element 23, and provides a third reset signal to the third light-emitting element 23 under a condition that the third reset module 113 is turned on.

Illustratively, one end of the third reset module 113 may be connected to a third reset signal terminal 33, which may be configured to provide a third reset signal, and the other end of the third reset module 113 may be connected to the anode of the third light-emitting element 23 at a node N43. The third reset module 113 may be turned on or off under the control of the first scanning signal S(EL), and under a condition that the first scanning signal S(EL) controls the third reset module 113 to be turned on, the third reset module 113 can transmit the third reset signal provided by the third reset signal terminal 33 to the anode of the third light-emitting element 23 so as to reset the anode of the third light-emitting element 23.

As an example, the third reset module 113 may include a third transistor M13, a gate electrode of the third transistor M13 may receive the first scanning signal S(EL). A first electrode of the third transistor M13 may be connected to the third reset signal terminal 33, and a second electrode of the third transistor M13 is connected to the anode of the third light-emitting element 23 at the node N43. The first scanning signal S(EL) is a pulse signal, and the third transistor M13 is controlled to be turned on or off through a high or low level of the pulse signal.

In the first reset sub-phase p1, the first scanning signal S(EL) is a turn-on level, the third reset module 113 may be turned on, and a voltage of the third reset signal is Vref23, Vref21 Vref23, and Vref22≠Vref23. In other words, in the first reset sub-phase p1, the anode of the first light-emitting element 21, the anode of the second light-emitting element 22, and the anode of the third light-emitting element 23 are respectively reset using different voltages.

In embodiments of the present application, the anode of the first light-emitting element, the anode of the second light-emitting element and the anode of the third light-emitting element are respectively reset with different voltages in the first reset sub-phase, so that difficulty degrees of charging the anodes of the first light-emitting element, the second light-emitting element and the third light-emitting element are different, and thus light-emitting difficulty degrees of the first light-emitting element, the second light-emitting element and the third light-emitting element are different. It is understood that a relationship between a light-emitting luminance and a corresponding target luminance is also different for the first light-emitting element, the second light-emitting element, and the third light-emitting element. Therefore, by resetting the anodes of the first light-emitting element, the second light-emitting element, and the third light-emitting element with different voltages in the first reset sub-phase, light-emitting difficulty degrees of different light-emitting elements can be adjusted, and thus luminance of different light-emitting elements can be adjusted, which can help to improve the color cast phenomenon.

In addition, when the light-emitting elements emit light, transistors of the first reset module, the second reset module and the third reset module do not turn off completely, i.e. there is a leakage current, and the greater a voltage difference across each of the transistors, the greater the leakage current will be, and an anode potential of the light-emitting element will be pulled down. In embodiments of the present application, by differentially designing a voltage of a reset signal, leakage degrees corresponding to different light-emitting elements can be adjusted, and thus the luminance of different light-emitting elements can be adjusted, so that the color cast phenomenon can also be improved.

The inventors have also found that an equivalent capacitance of a light-emitting element G that emits green light is the largest, an equivalent capacitance of a light-emitting element B that emits blue light is the second, and an equivalent capacitance of a light-emitting element R that emits red light is the smallest, and an effect of a drive current change on the light-emitting element G that emits green light in the first frame is the largest, resulting in that a luminance of the light-emitting element G that emits green light in the first frame is the lowest, a luminance of the light-emitting element B that emits blue light in the first frame is the second, and a luminance of the light-emitting element R that emits red light in the first frame is the highest, thereby resulting in that a white picture appears to have a purple color drag phenomenon.

Alternatively, in the case where the first light-emitting element 21 emits green light, the second light-emitting element 22 emits blue light, and the third light-emitting element 23 emits red light, Vref21>Vref22>Vref23. From another perspective, in the case where an equivalent capacitance of the first light-emitting element 21 is greater than an equivalent capacitance of the second light-emitting element 22, and the equivalent capacitance of the second light-emitting element 22 is greater than an equivalent capacitance of the third light-emitting element 23, Vref21>Vref22>Vref23.

Thus, in at least one of the holding phases, the first light-emitting element 21 is more likely to be charged to the power-on voltage, the first light-emitting element 21 is more likely to emit light, and a leakage degree corresponding to the first light-emitting element 21 is smaller, thereby contributing to improve a luminance of the first light-emitting element 21. Since the third light-emitting element 23 is less likely to be charged to the power-on voltage, the third light-emitting element 23 is less likely to emit light, and a leakage degree corresponding to the third light-emitting element 23 is relatively large, which is equivalent to reduce a luminance of the third light-emitting element 23, thereby contributing to improve the color cast phenomenon.

A difference between the equivalent capacitance of the light-emitting element G that emits green light and the equivalent capacitance of the light-emitting element B that emits blue light is relatively large, while a difference between the equivalent capacitance of the light-emitting element B that emits blue light and the equivalent capacitance of the light-emitting element R that emits red light is relatively small. Taking the case where the first light-emitting element 21 emits green light, the second light-emitting element 22 emits blue light, and the third light-emitting element 23 emits red light as an example, |Vref21−Vref22|>|Vref22−Vref23|.

In this way, it is possible to prevent a difference between the luminance of the second light-emitting element 22 and the luminance of the third light-emitting element 23 from being adjusted to be large, so that it is more advantageous to avoid the color cast phenomenon.

As one example, a difference between Vref21 and Vref22 may be greater than or equal to 0.2 V and less than or equal to 0.5 V. A difference between Vref22 and Vref23 may be greater than 0 V and less than or equal to 0.1 V.

Referring to FIG. 1, the first pixel circuit 101 may further include a fourth reset module 151 and the first drive module 121, wherein the fourth reset module 151 is connected to the first drive module 121, and provides the first reset signal to the first drive module 121 under a condition that the fourth reset module 151 is turned on.

It can be understood that the first drive module 121 and the first light-emitting element 21 share the first reset signal. Illustratively, one end of the fourth reset module 151 may be connected to the first reset signal terminal 31, the other end of the fourth reset module 151 is connected to the node N11, and a control terminal of the first drive module 121 is connected to the node N11. The fourth reset module 151 may be turned on or off under the control of a third scanning signal S(n−1), and under a condition that the third scanning signal S(n−1) controls the fourth reset module 151 to be turned on, the fourth reset module 151 can transmit the first reset signal provided by the first reset signal terminal 31 to the control terminal of the first drive module 121 so as to reset the control terminal of the first drive module 121.

As an example, the fourth reset module 151 may include a fourth transistor M51 and the first drive module 121 may include a first drive transistor M21. A gate electrode of the fourth transistor M51 may receive the third scanning signal S(n−1). A first electrode of the fourth transistor M51 may be connected to the first reset signal terminal 31, and a second electrode of the fourth transistor M51 is connected to a gate electrode of the first drive transistor M21 at the node N11. The third scanning signal S(n−1) is a pulse signal, and the fourth transistor M51 is controlled to be turned on or off through a high or low level of the pulse signal.

Referring to FIG. 2, the second pixel circuit 102 may further include a fifth reset module 152 and the second drive module 122, wherein the fifth reset module 152 is connected to the second drive module 122, and provides the second reset signal to the second drive module 122 under a condition that the fifth reset module 152 is turned on.

It can be understood that the second drive module 122 and the second light-emitting element 22 share the second reset signal. Illustratively, one end of the fifth reset module 152 may be connected to the second reset signal terminal 32, the other end of the fifth reset module 152 is connected to the node N12, and a control terminal of the second drive module 122 is connected to the node N12. The fifth reset module 152 may be turned on or off under the control of the third scanning signal S(n−1), and under a condition that the third scanning signal S(n−1) controls the fifth reset module 152 to be turned on, the fifth reset module 152 can transmit the second reset signal provided by the second reset signal terminal 32 to the control terminal of the second drive module 122 so as to reset the control terminal of the second drive module 122.

As one example, the fifth reset module 152 may include a fifth transistor M52 and the second drive module 122 may include a second drive transistor M22. A gate electrode of the fifth transistor M52 may receive the third scanning signal S(n−1). A first electrode of the fifth transistor M52 may be connected to the second reset signal terminal 32, and a second electrode of the fifth transistor M52 is connected to a gate electrode of the second drive transistor M22 at the node N12. The third scanning signal S(n−1) is a pulse signal, and the fifth transistor M52 is controlled to be turned on or off through a high or low level of the pulse signal.

As shown in FIG. 4, the data writing phase may include a second reset sub-phase p2, wherein in the second reset sub-phase p2, the first scanning signal S(EL) is a turn-on level, the first reset module 111 and the second reset module 112 are turned on, and a voltage of the first reset signal is Vref11, a voltage of the second reset signal is Vref12, and Vref11=Vref12.

The drive module may be reset in the data writing phase, and therefore the data writing phase may also include a third reset sub-phase p3, and in the third reset sub-phase p3, the third scanning signal S(n−1) is a turn-on level, the fourth reset module 151 and the fifth reset module 152 are turned on, a voltage of the first reset signal is Vref11, and a voltage of the second reset signal is Vref12.

Since a reset condition of the drive module affects writing of a data signal and a bias state of the drive module, in embodiments of the present application, resetting the first drive module and the second drive module with the same voltage can improve a reset consistency of the first drive module and the second drive module, thereby improving a display uniformity.

Illustratively, the second reset sub-phase p2 and the data writing sub-phase d may overlap in time, and/or the second reset sub-phase p2 and the third reset sub-phase p3 may overlap in time. It can be understood that the third reset sub-phase p3 precedes the data writing sub-phased.

Illustratively, to avoid frequent switching of a voltage of a reset signal, the voltage of the first reset signal may always be maintained as Vref11 and the voltage of the second reset signal may always be maintained as Vref12 throughout the data writing phase.

Referring to FIG. 5, the pixel circuits 10 further include the third pixel circuit 103, and the light-emitting elements 20 further include the third light-emitting element 23. The first light-emitting element 21, the second light-emitting element 22, and the third light-emitting element 23 each have a different light-emitting color.

The third pixel circuit 103 includes the third reset module 113, a sixth reset module 153 and a third drive module 123. The third reset module 113 is connected to the third light-emitting element 23, and provides the third reset signal to the third light-emitting element 23 under a condition that the third reset module 113 is turned on.

The sixth reset module 153 is connected to the third drive module 123, and provides the third reset signal to the third drive module 123 under a condition that the sixth reset module 153 is turned on.

It can be understood that the third drive module 123 and the third light-emitting element 23 share the third reset signal. Illustratively, one end of the sixth reset module 153 may be connected to the third reset signal terminal 33, the other end of the sixth reset module 153 is connected to a node N13, and a control terminal of the third drive module 123 is connected to the node N13. The sixth reset module 153 may be turned on or off under the control of the third scanning signal S(n−1), and under a condition that the third scanning signal S(n−1) controls the sixth reset module 153 to be turned on, the sixth reset module 153 can transmit the third reset signal provided by the third reset signal terminal 33 to the control terminal of the third drive module 123 so as to reset the control terminal of the third drive module 123.

As one example, the sixth reset module 153 may include a sixth transistor M53 and the third drive module 123 may include a third driver transistor M23. A gate electrode of the sixth transistor M53 may receive the third scanning signal S(n−1). A first electrode of the sixth transistor M53 may be connected to the third reset signal terminal 33, and a second electrode of the sixth transistor M53 is connected to a gate electrode of the third driver transistor M23 at the node N13. The third scanning signal S(n−1) is a pulse signal, and the sixth transistor M53 is controlled to be turned on or off through a high or low level of the pulse signal.

Figure 6:
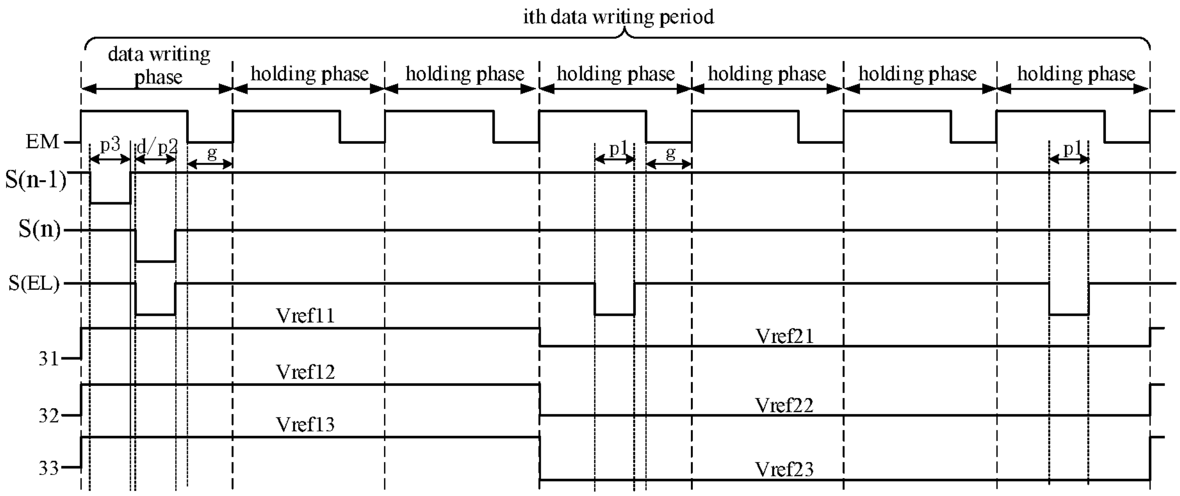
FIG. 6 illustrates another timing schematic diagram for a pixel circuit in a display panel according to an embodiment of the present application.

As shown in FIG. 6, in the second reset sub-phase p2, the first scanning signal S(EL) is a turn-on level, the third reset module 113 is turned on, and a voltage of the third reset signal is Vref13, Vref11=Vref12=Vref13. In the first reset sub-phase p1, the first scanning signal S(EL) is a turn-on level, the third reset module 113 is turned on, and a voltage of the third reset signal is Vref23, Vref21>Vref22>Vref23.

As described above, the drive module may be reset in the data writing phase, so that in the third reset sub-phase p3, the third scanning signal S(n−1) is a turn-on level, the sixth reset module 153 is turned on, and a voltage of the third reset signal is Vref13.

Similarly, since a reset condition of the drive module affects writing of a data signal and a bias state of the drive module, in embodiments of the present application, using the same voltage to reset the first drive module, the second drive module and the third drive module can improve a reset consistency of the first drive module, the second drive module and the third drive module, thereby improving a display uniformity.

Illustratively, to avoid frequent switching of a voltage of a reset signal, the voltage of the third reset signal may also be maintained at Vref13 throughout the data writing phase.

Since the more negative the voltage of the reset signal, i.e. the smaller the voltage of the reset signal, the better a reset effect on an anode will be. In some embodiments, in the case where Vref11=Vref12=Vref13, and Vref21>Vref22>Vref23, Vref11>Vref21.

Figure 7:
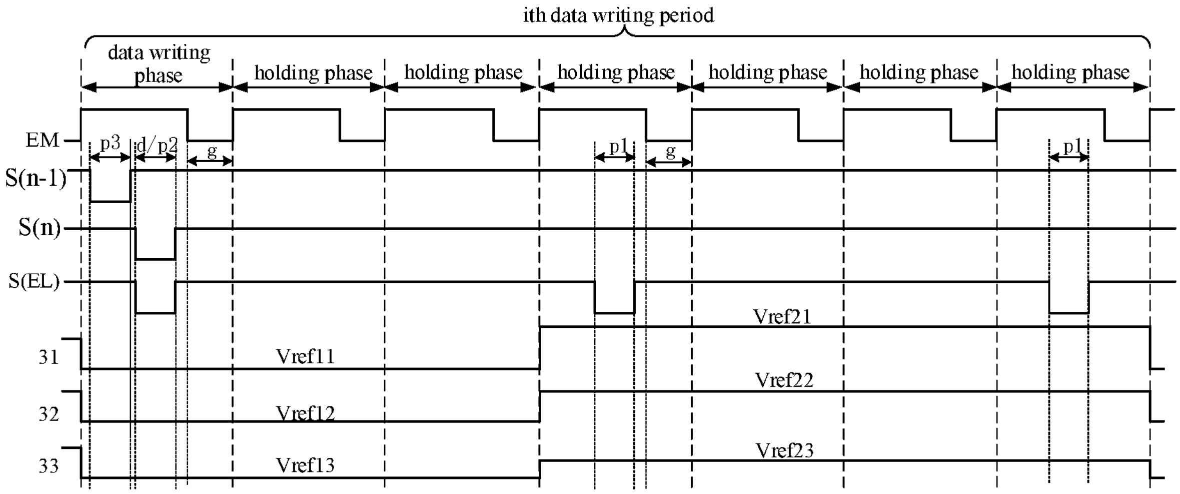
FIG. 7 illustrates yet another timing schematic diagram for a pixel circuit in a display panel according to an embodiment of the present application.

As described above, when a light-emitting element emits light, an anode of the light-emitting element needs to be raised from a voltage of a reset signal to a power-on voltage. The more positive the voltage of the reset signal is, that is, the greater the voltage of the reset signal is, the closer the voltage of the reset signal is to the power-on voltage, the easier it is for the anode of the light-emitting element to be charged to the power-on voltage, and the easier it is for the light-emitting element to emit light. In other embodiments, as shown in FIG. 7, in the case where Vref11=Vref12=Vref13, and Vref21>Vref22>Vref23, Vref13<Vref23.

Figure 8:
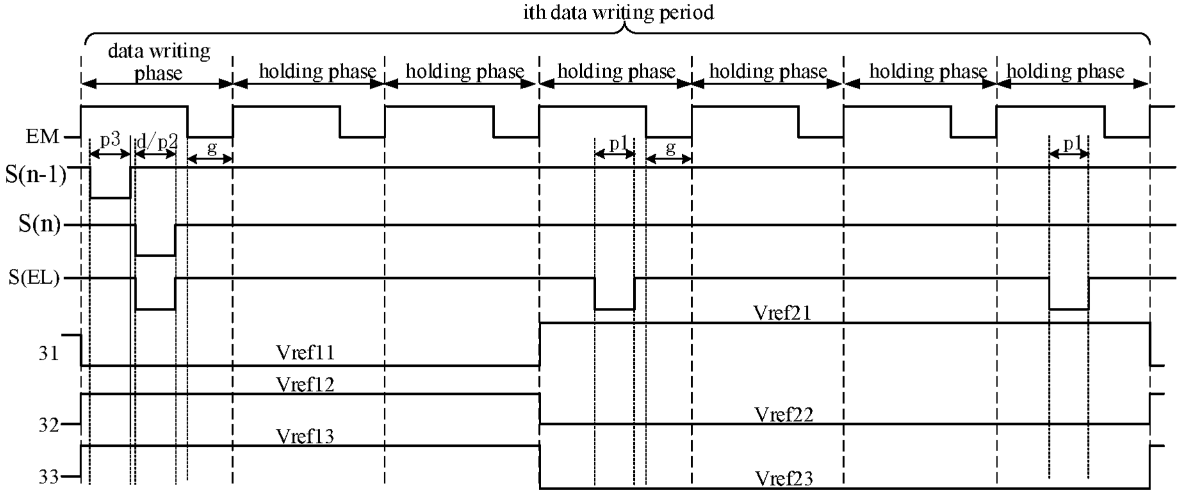
FIG. 8 illustrates yet another timing schematic diagram for a pixel circuit in a display panel according to an embodiment of the present application.

In some embodiments, in order to make the first light-emitting element 21 emit light more easily than the second light-emitting element 22 and the third light-emitting element 23, as shown in FIG. 8, in the case where Vref11=Vref12=Vref13, and Vref21>Vref22>Vref23, Vref11<Vref21, and Vref11>Vref22.

In some embodiments, to avoid frequent switching of voltages of reset signals, in the case where Vref11=Vref12=Vref13, and Vref21>Vref22>Vref23, one of Vref21, Vref22, Vref23 may be equal to Vref11.

In some embodiments, different reset signals may be used to reset the drive module and the light-emitting elements, respectively.

Figure 9:
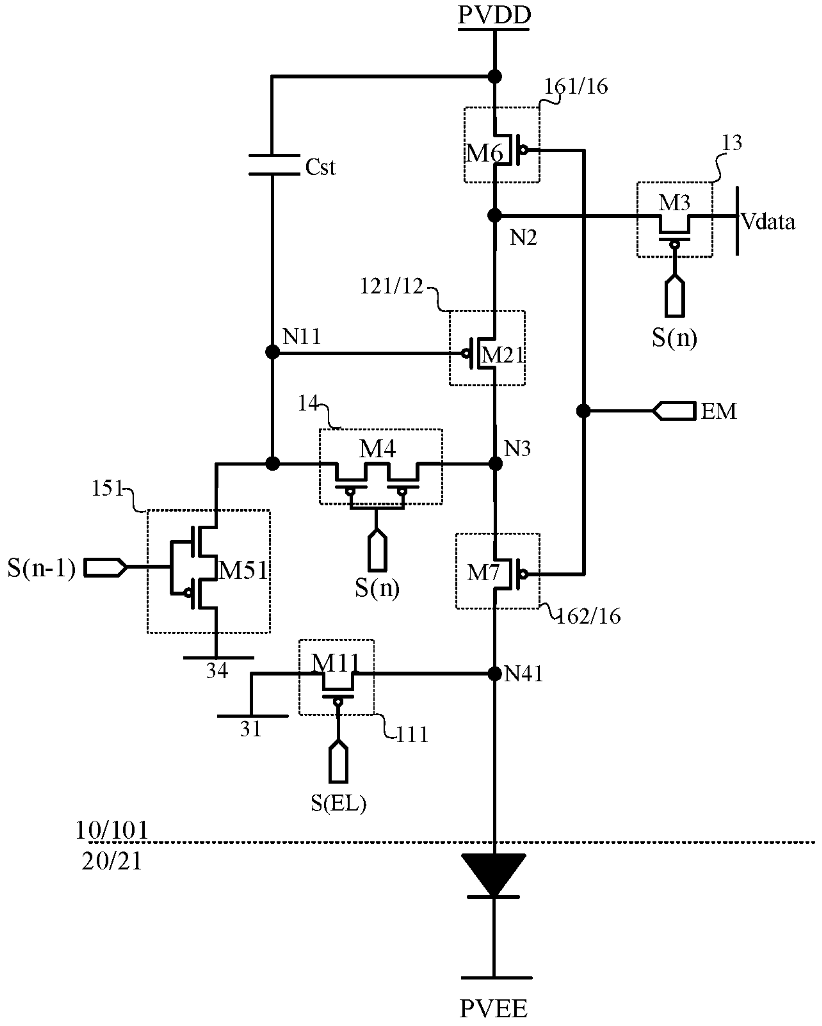
FIG. 9 illustrates a schematic diagram of another structure of a first pixel circuit in a display panel according to an embodiment of the present application.

As shown in FIG. 9, the first pixel circuit 101 may further include the fourth reset module 151 and the first drive module 121, the fourth reset module 151 is connected to the first drive module 121, and provides a fourth reset signal to the first drive module 121 under a condition that the fourth reset module 151 is turned on.

FIG. 9 is the same as FIG. 1 (and the same contents will not be described again), except that one end of the fourth reset module 151 may be connected to a fourth reset signal terminal 34, which may provide the fourth reset signal.

Figure 10:
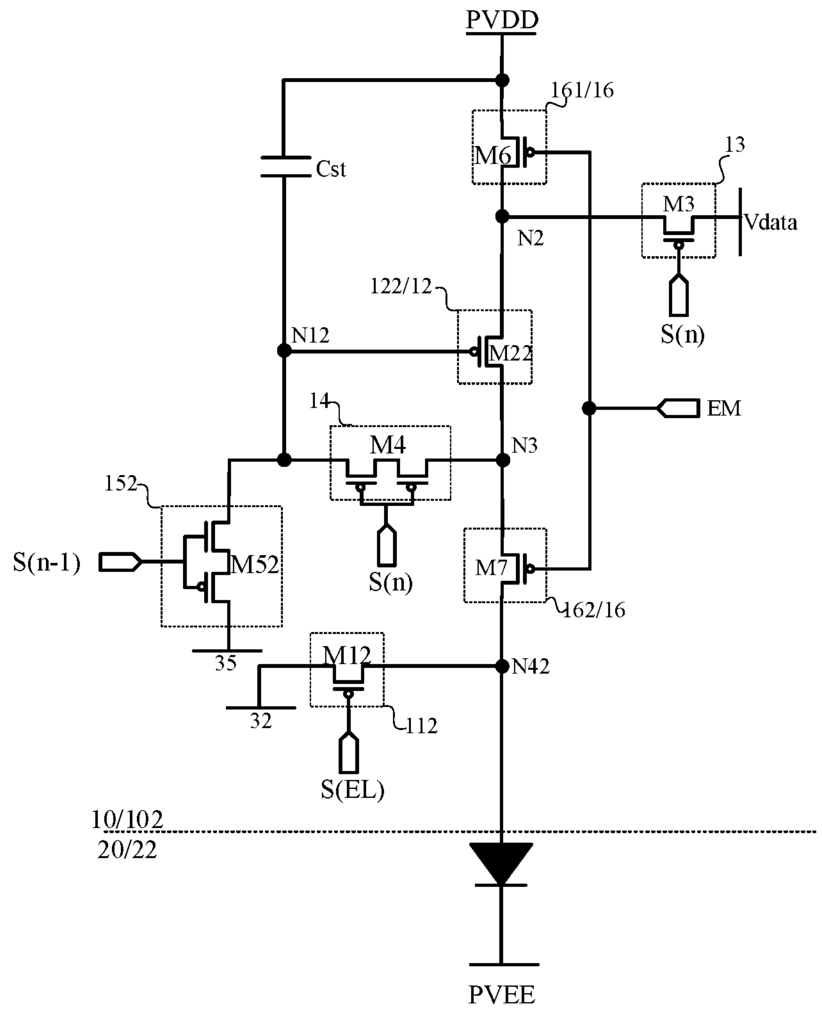
FIG. 10 illustrates a schematic diagram of another structure of a second pixel circuit in a display panel according to an embodiment of the present application.

As shown in FIG. 10, the second pixel circuit 102 may further include the fifth reset module 152 and the second drive module 122, wherein the fifth reset module 152 is connected to the second drive module 122, and provides a fifth reset signal to the second drive module 122 under a condition that the fifth reset module 152 is turned on.

FIG. 10 is the same as FIG. 2 (and the same contents will not be described again), except that one end of the fifth reset module 152 may be connected to a fifth reset signal terminal 35, which may provide the fifth reset signal.

Illustratively, in order to ensure a reset consistency of the drive module, a voltage of the fourth reset signal and a voltage of the fifth reset signal may be equal. The fourth reset signal terminal 34 may be multiplexed as the fifth reset signal terminal 35, that is, the fourth reset signal terminal 34 and the fifth reset signal terminal 35 may be a same signal terminal.

The data writing phase includes the second reset sub-phase p2, and in the second reset sub-phase p2, the first reset module 111 and the second reset module 112 are turned on, and a voltage of the first reset signal is Vref11, a voltage of the second reset signal is Vref12, and Vref11 Vref12.

In embodiments of the present application, since the drive module and the light-emitting elements no longer share a same reset signal, a voltage of the first reset signal and a voltage of the second reset signal may also be differentially set in the data writing phase, and then light-emitting difficulty degrees of different light-emitting elements can also be adjusted in the data writing phase, so as to adjust the luminance of different light-emitting elements, thereby further contributing to improve the color cast phenomenon.

A voltage of the fourth reset signal and a voltage Vref11 of the first reset signal may be the same or different; a voltage of the fifth reset signal and a voltage Vref12 of the second reset signal may be the same or different.

As an example, since the greater a reset voltage of an anode, the more advantageous it is to reduce a difficulty degree of charging the anode, and a slightly smaller reset voltage of a gate electrode of a drive transistor is advantageous for improving a reset effect of the gate electrode of the drive transistor, a voltage of the fourth reset signal may be less than a voltage Vref11 of the first reset signal, and a voltage of the fifth reset signal may be less than a voltage Vref12 of the second reset signal, and thus a short-term afterimage can be improved and the luminance of the first frame can be improved.

As another example, since the lower a reset voltage of an anode, the better a reset effect of the anode, and a slightly larger reset voltage of a gate electrode of a drive transistor is advantageous for reducing a difficulty degree of charging the gate electrode of the drive transistor, a voltage of the fourth reset signal may be larger than a voltage Vref11 of the first reset signal, and a voltage of the fifth reset signal may be larger than a voltage Vref12 of the second reset signal.

Similarly, a voltage of the first reset signal and a voltage of the second reset signal in the data writing phase may be differentially set based on light-emitting colors of different light-emitting elements or equivalent capacitances of different light-emitting elements. In the case where the first light-emitting element 21 emits green light and the second light-emitting element 22 emits blue light or red light, Vref21>Vref22 and Vref11>Vref12. From another perspective, in the case where an equivalent capacitance of the first light-emitting element 21 is greater than an equivalent capacitance of the second light-emitting element 22, Vref21>Vref22 and Vref11>Vref12.

In this way, not only in at least one of the holding phases but also in the data writing phase, the first light-emitting element 21 is easier to be charged to the power-on voltage, the first light-emitting element 21 is easier to emit light, and a leakage degree corresponding to the first light-emitting element 21 is smaller, thereby further contributing to improve the luminance of the first light-emitting element 21 and improve the color cast phenomenon.

Illustratively, Vref21−Vref22=Vref11−Vref12.

Figure 11:
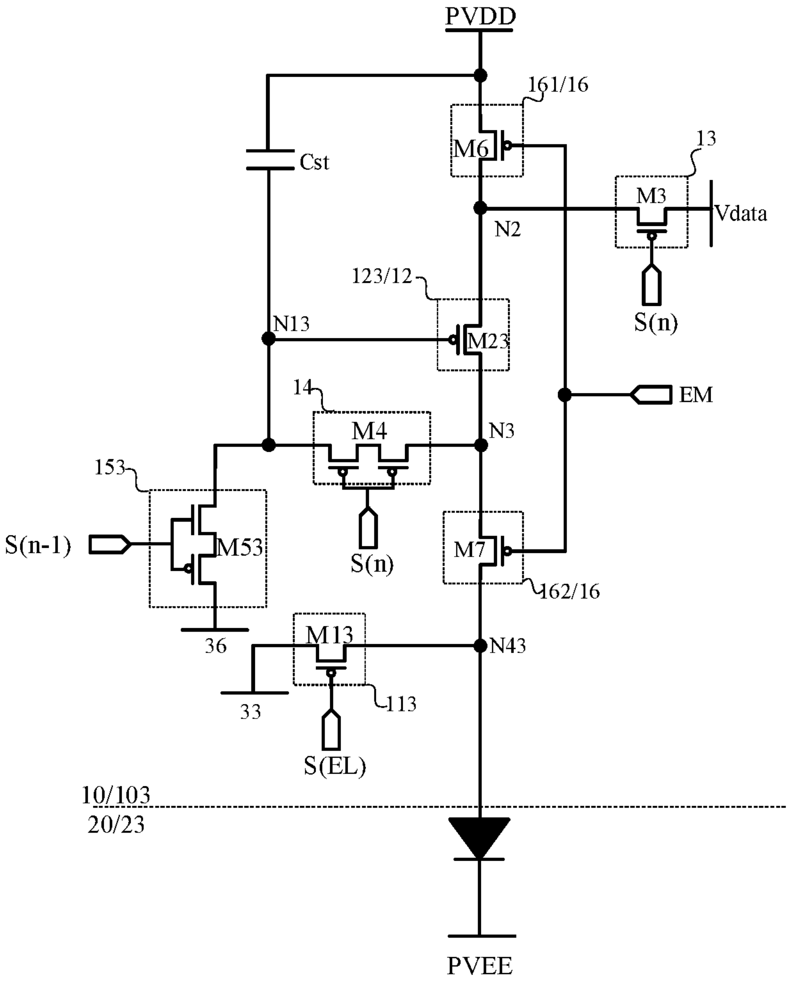
FIG. 11 illustrates a schematic diagram of another structure of a third pixel circuit in a display panel according to an embodiment of the present application.

As shown in FIG. 11, the pixel circuits 10 further include the third pixel circuit 103, and the light-emitting elements 20 further include the third light-emitting element 23. The first light-emitting element 21, the second light-emitting element 22, and the third light-emitting element 23 each have a different light-emitting color.

The third pixel circuit 103 includes the third reset module 113, the sixth reset module 153 and the third drive module 123. The third reset module 113 is connected to the third light-emitting element 23, and provides the third reset signal to the third light-emitting element 23 under a condition that the third reset module 113 is turned on.

The sixth reset module 153 is connected to the third drive module 123, and provides a sixth reset signal to the third drive module 123 under a condition that the sixth reset module 153 is turned on.

FIG. 11 is the same as FIG. 5 (and the same contents will not be described again), except that one end of the sixth reset module 153 may be connected to a sixth reset signal terminal 36, which may provide the sixth reset signal.

Illustratively, in order to ensure a reset consistency of the drive module, a voltage of the fourth reset signal, a voltage of the fifth reset signal, and a voltage of the sixth reset signal may be equal. The fourth reset signal terminal 34 may be multiplexed as the fifth reset signal terminal 35, and the fourth reset signal terminal 34 may be multiplexed as the sixth reset signal terminal 36, namely, the fourth reset signal terminal 34, the fifth reset signal terminal 35 and the sixth reset signal terminal 36 may be a same signal terminal.

In the second reset sub-phase p2 and in the first reset sub-phase p1, the third reset module 113 is turned on, and in the second reset sub-phase p2, a voltage of the third reset signal is Vref13, and in the first reset sub-phase p1, a voltage of the third reset signal is Vref23; Vref21>Vref22>Vref23, and Vref11>Vref12>Vref13.

Likewise, in embodiments of the present application, since the drive module and the light-emitting elements no longer share a same reset signal, a voltage of the first reset signal, a voltage of the second reset signal and a voltage of the third reset signal may also be set differently in the data writing phase, and then light-emitting difficulty degrees of different light-emitting elements can also be adjusted in the data writing phase, so as to adjust the luminance of different light-emitting elements, thereby further contributing to improve the color cast phenomenon.

A voltage of the sixth reset signal and a voltage Vref13 of the third reset signal may be the same or different.

As an example, since the greater a reset voltage of an anode, the more advantageous it is to reduce a difficulty degree of charging the anode, and a slightly smaller reset voltage of a gate electrode of a drive transistor is advantageous for improving a reset effect of the gate electrode of the drive transistor, a voltage of the sixth reset signal may be less than a voltage Vref13 of the third reset signal.

As another example, since the lower a reset voltage of an anode, the better a reset effect of the anode, and a slightly larger reset voltage of a gate electrode of a drive transistor is advantageous for reducing a difficulty degree of charging the gate electrode of the drive transistor, a voltage of the sixth reset signal may be greater than a voltage Vref13 of the third reset signal.

As described above, a difference between the equivalent capacitance of the light-emitting element G that emits green light and the equivalent capacitance of the light-emitting element B that emits blue light is relatively large, while a difference between the equivalent capacitance of the light-emitting element B that emits blue light and the equivalent capacitance of the light-emitting element R that emits red light is relatively small. Still taking the case where the first light-emitting element 21 emits green light, the second light-emitting element 22 emits blue light, and the third light-emitting element 23 emits red light as an example, |Vref11−Vref12|>|Vref12−Vref13|.

As an example, a difference between Vref11 and Vref12 may be greater than or equal to 0.2 V and less than or equal to 0.5 V. A difference between Vref12 and Vref13 may be greater than 0 V and less than or equal to 0.1 V.

Illustratively, Vref21−Vref22=Vref11−Vref12, and Vref22−Vref23=Vref12−Vref13.

In some embodiments, to avoid frequent switching of voltages of reset signals, in the case where Vref21>Vref22>Vref23, and Vref11>Vref12>Vref13, Vref21=Vref11; and/or, Vref22=Vref12; and/or, Vref23=Vref13.

In some embodiments, as shown in FIG. 5, the pixel circuits 10 further include the third pixel circuit 103, and the light-emitting elements 20 further include the third light-emitting element 23. The first light-emitting element 21, the second light-emitting element 22, and the third light-emitting element 23 each have a different light-emitting color. As one example, the first light-emitting element 21 may be a light-emitting element that emits green light, the second light-emitting element 22 may be a light-emitting element that emits blue light, and the third light-emitting element 23 may be a light-emitting element that emits red light.

The third pixel circuit 103 includes the third reset module 113, wherein the third reset module 113 is connected to the third light-emitting element 23, and provides the third reset signal to the third light-emitting element 23 under a condition that the third reset module 113 is turned on.

In the first reset sub-phase p1, the first scanning signal S(EL) is a turn-on level, the third reset module 113 may be turned on, and a voltage of the third reset signal is Vref23.

A difference between the equivalent capacitance of the light-emitting element G that emits green light and the equivalent capacitance of the light-emitting element B that emits blue light is relatively large, while a difference between the equivalent capacitance of the light-emitting element B that emits blue light and the equivalent capacitance of the light-emitting element R that emits red light is relatively small. Still taking the case where the first light-emitting element 21 emits green light, the second light-emitting element 22 emits blue light, and the third light-emitting element 23 emits red light as an example, Vref22=Vref23.

In embodiments of the present application, in the first reset sub-phase p1, the second light-emitting element 22 and the third light-emitting element 23 are reset using the same voltage, so that the second reset module and the third reset module can be connected to a same reset signal terminal, and a number of reset signal terminals can be reduced.

In some embodiments, in the second reset sub-phase p2, the first reset module 111, the second reset module 112, and the third reset module 113 are turned on, and a voltage of the first reset signal is Vref11, a voltage of the second reset signal is Vref12, and a voltage of the third reset signal is Vref13. Vref11=Vref12=Vref13=Vref22=Vref23. In this way, a number of voltage switches of reset signals can be reduced, which is advantageous in reducing power consumption.

Figure 12:
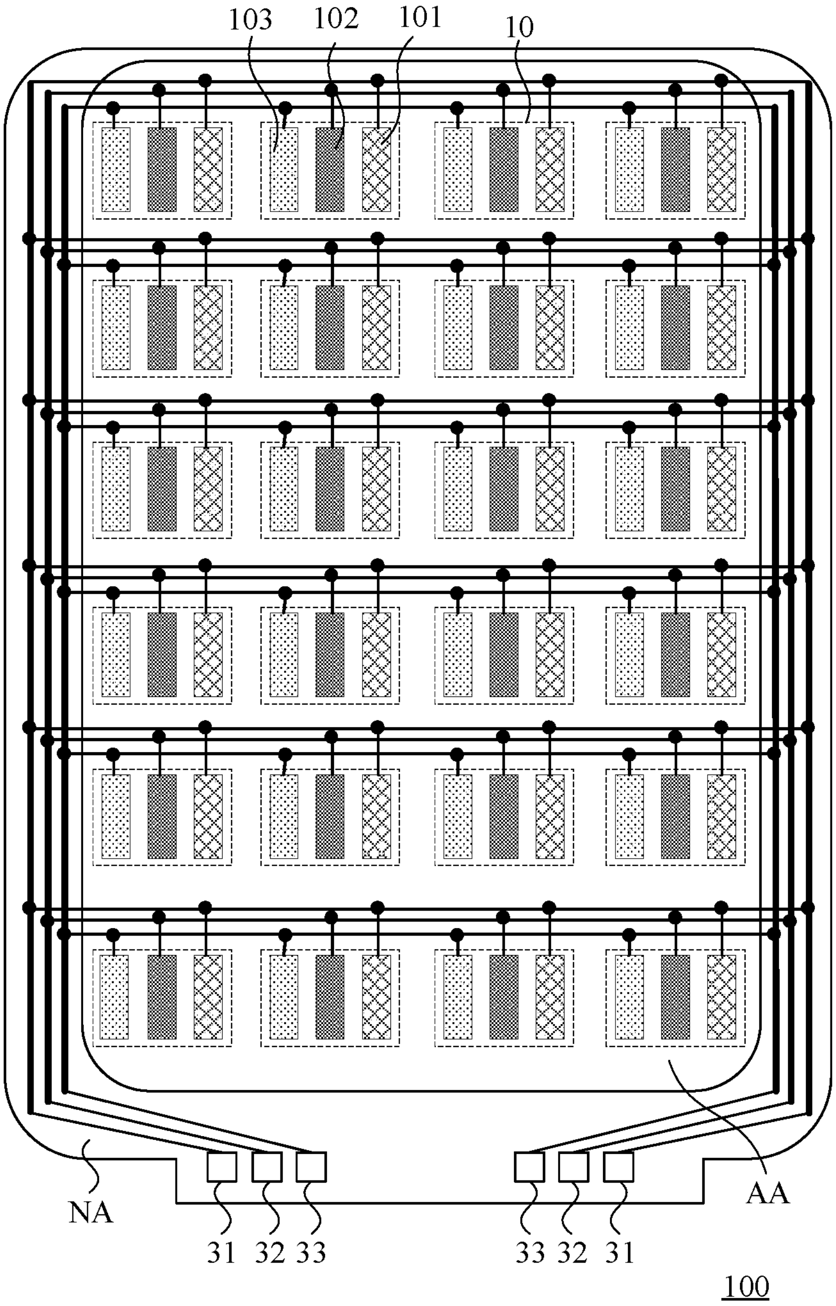
FIG. 12 illustrates a schematic diagram of a structure of a display panel according to an embodiment of the present application.

As shown in FIG. 12, a display panel 100 may include N rows of the pixel circuits 10, and each row of the pixel circuits 10 may include the first pixel circuit 101 and the second pixel circuit 102. Each row of the pixel circuits 10 may also include the third pixel circuit 103.

In the N rows of the pixel circuits 10, a plurality of the first reset modules in a plurality of the first pixel circuits 101 may be connected to the same first reset signal terminal 31, and the first reset signal terminal 31 provides the first reset signal. In the N rows of the pixel circuits 10, a plurality of the second reset modules in a plurality of the second pixel circuits 102 may be connected to the same second reset signal terminal 32, the second reset signal terminal 32 provides the second reset signal. In the N rows of the pixel circuits 10, a plurality of the third reset modules in a plurality of the third pixel circuits 103 may be connected to the same third reset signal terminal 33, and the second reset signal terminal 33 provides the third reset signal.

It can be understood that, in the case of ignoring a signal delay, it may be considered that the first reset signal provided by the first reset signal terminal 31 can be simultaneously transmitted to the first reset module in each row of the pixel circuits. Similarly, in the case of ignoring the signal delay, it may be considered that the second reset signal provided by the second reset signal terminal 32 can be simultaneously transmitted to the second reset module in each row of the pixel circuits; in the case of ignoring the signal delay, it may be considered that the third reset signal provided by the third reset signal terminal 33 can be simultaneously transmitted to the third reset module in each row of the pixel circuits.

During display of a picture on the display panel, the pixel circuits may be scanned row by row, so that each row of the pixel circuits successively enters its corresponding data writing phase. Illustratively, as shown in FIG. 13, during time of one frame picture, the data writing phase (j) of a jth row of the pixel circuits may follow the data writing phase (i) of a ith row of the pixel circuits, the data writing phase (j) of the jth row of the pixel circuits and the holding phase (i) of the ith row of the pixel circuits may overlap in time, j>i.

Figure 13:
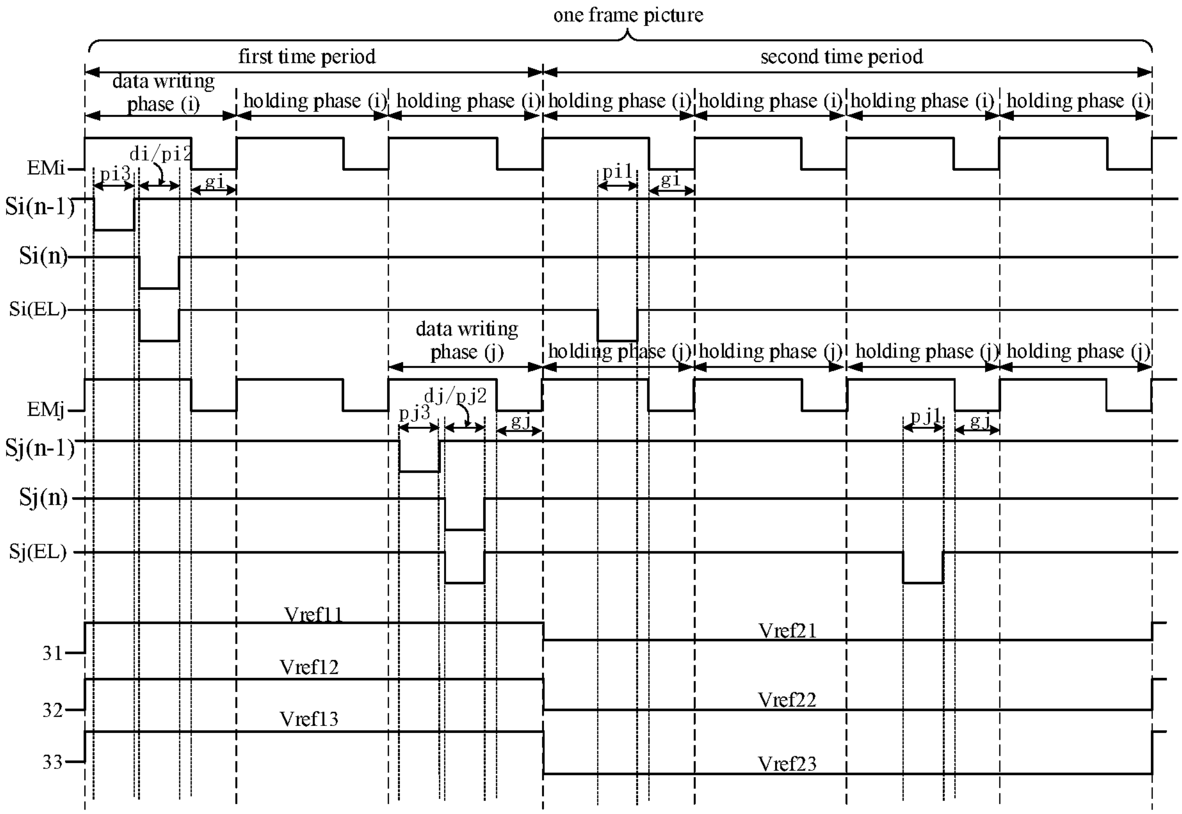
FIG. 13 illustrates yet another timing schematic diagram for a pixel circuit in a display panel according to an embodiment of the present application.

Furthermore, in FIG. 13, EMi represents the light-emitting control signal corresponding to the ith row of the pixel circuits, and EMj represents the light-emitting control signal corresponding to the jth row of the pixel circuits. Si(EL) represents the first scanning signal corresponding to the ith row of the pixel circuits, and Sj(EL) represents the first scanning signal corresponding to the jth row of the pixel circuits. Si(n) represents the second scanning signal corresponding to the ith row of the pixel circuits, and Sj(n) represents the second scanning signal corresponding to the jth row of the pixel circuits. Si(n−1) represents the third scanning signal corresponding to the ith row of the pixel circuits, and Sj(n−1) represents the third scanning signal corresponding to the jth row of the pixel circuits. pi1 represents the first reset sub-phase corresponding to the ith row of the pixel circuits, and pj1 represents the first reset sub-phase corresponding to the jth row of the pixel circuits. pi2 represents the second reset sub-phase corresponding to the ith row of the pixel circuits, and pj2 represents the second reset sub-phase corresponding to the jth row of the pixel circuits. pi3 represents the third reset sub-phase corresponding to the ith row of the pixel circuits, and pj3 represents the third reset sub-phase corresponding to the jth row of the pixel circuits. di represents the data writing sub-phase corresponding to the ith row of the pixel circuits, and dj represents the data writing sub-phase corresponding to the jth row of the pixel circuits. gi represents the light-emitting sub-phase corresponding to the ith row of the pixel circuits, and gj represents the light-emitting sub-phase corresponding to the jth row of the pixel circuits.

Since the first reset modules in different rows of the pixel circuits are connected to the same first reset signal terminal, the second reset modules in different rows of the pixel circuits are connected to the same second reset signal terminal, and the third reset modules in different rows of the pixel circuits are connected to the same third reset signal terminal, in order to ensure that each reset signal terminal can accurately provide a required reset voltage to each row of the pixel circuits, as shown in FIG. 13, time of one frame picture of the display panel may include a first time period and a second time period, and the first time period may include the data writing phase of each row of the pixel circuits.

It can be understood that the first time period may further include a portion of the holding phases of at least a portion of rows of the pixel circuits. During the second time period, each row of the pixel circuits may be in the holding phases. During the second time period, an operation process of each row of the pixel circuits may include one or more holding phases, and at least one of the holding phases includes the first reset sub-phase pi.

During the first time period, a voltage of the first reset signal terminal 31 may be maintained as Vref11; during the second time period, the voltage of the first reset signal terminal 31 switches to Vref21, and during the second time period, the voltage of the first reset signal terminal 31 may be maintained as Vref21.

During the first time period, a voltage of the second reset signal terminal 32 may be maintained as Vref12; during the second time period, the voltage of the second reset signal terminal 32 switches to Vref22, and during the second time period, the voltage of the second reset signal terminal 32 may be maintained as Vref22.

During the first time period, a voltage of the third reset signal terminal 33 may be maintained as Vref13; during the second time period, the voltage of the third reset signal terminal 33 switches to Vref23, and during the second time period, the voltage of the third reset signal terminal 33 may be maintained as Vref23.

Note that a transistor in embodiments of the present application may be a NMOS-type transistor or a PMOS-type transistor. For a NMOS-type transistor, a turn-on level is a high level and a cut-off level is a low level. That is, under a condition that a gate electrode of the NMOS-type transistor is at a high level, it is turned on between a first electrode and a second electrode thereof, and under a condition that the gate electrode of the NMOS-type transistor is at a low level, it is turned off between the first electrode and the second electrode thereof. For a PMOS-type transistor, a turn-on level is low level and a cut-off level is a high level. That is, under a condition that a control terminal of the PMOS-type transistor is at a low level, it is turned on between a first electrode and a second electrode thereof, and under a condition that the control terminal of the PMOS-type transistor is at a high level, it is turned off between the first electrode and the second electrode thereof. In specific implementations, the gate electrode of each of the above-mentioned transistors serves as a control electrode thereof, and based on a signal of the gate electrode of each transistor and a type thereof, a first electrode thereof may serve as a source electrode and a second electrode thereof may serve as a drain electrode, or a first electrode thereof may serve as a drain electrode and a second electrode thereof may serve as a source electrode, however, no distinction is made herein. Furthermore, in embodiments of the present application, a turn-on level and a cut-off level are referred in a general sense, wherein the turn-on level refers to any level capable of turning on a transistor, and the cut-off level refers to any level capable of cutting off/turning off the transistor.

Based on the same inventive concept, embodiments of the present application further provide a drive circuit for providing a signal to the display panel provided in the above-described embodiments. The display panel includes pixel circuits and light-emitting elements, wherein the pixel circuits include the first pixel circuit and the second pixel circuit, the light-emitting elements include the first light-emitting element and the second light-emitting element, and a light-emitting color of the first light-emitting element and a light-emitting color of the second light-emitting element are different. The first pixel circuit includes the first reset module, wherein the first reset module is connected to the first light-emitting element, and provides the first reset signal to the first light-emitting element under a condition that the first reset module is turned on. The second pixel circuit includes the second reset module, wherein the second reset module is connected to the second light-emitting element, and provides the second reset signal to the second light-emitting element under a condition that the second reset module is turned on.

A data writing period of the pixel circuits includes a data writing phase and one or more holding phases. At least one of the holding phases includes a first reset sub-phase, wherein in the first reset sub-phase, the first reset module and the second reset module are turned on, and the drive circuit provides the first reset signal and the second reset signal, a voltage of the first reset signal is Vref21, a voltage of the second reset signal is Vref22, and Vref21≠Vref22.

It can be understood that the drive circuit provided in embodiments of the present application has advantageous effects of the display panel provided in embodiments of the present application, and specific reference may be made to the detailed description of the display panel in the above-mentioned embodiments, which will not be described in this embodiment in detail herein.

Figure 14:
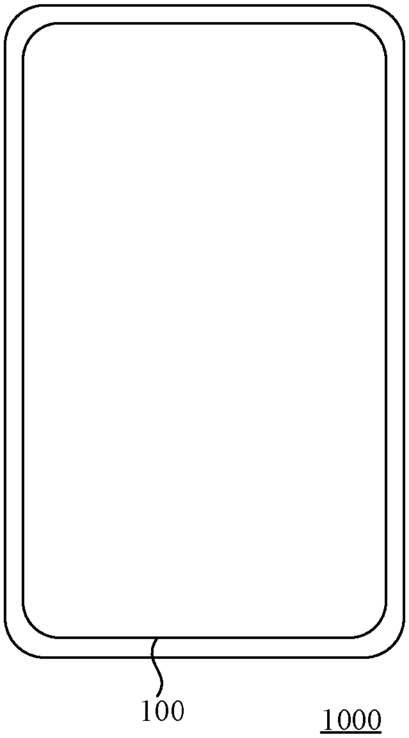
FIG. 14 illustrates a schematic diagram of a structure of a display device according to an embodiment of the present application.

The present application further provides a display device including the display panel provided in the present application. Referring to FIG. 14, which is a schematic diagram of a structure of a display device according to an embodiment of the present application. A display device 1000 provided in FIG. 14 includes the display panel 100 provided in any of embodiments described above in the present application. The embodiment of FIG. 10 only takes a mobile phone as an example to describe the display device 1000, it can be understood that the display device provided in embodiments of the present application may be other display devices having a display function, such as a wearable product, a computer, a television and a vehicle-mounted display device, which is not particularly limited in the present application. The display device provided in embodiments of the present application has advantageous effects of the display panel provided in embodiments of the present application, and specific reference may be made to the detailed description of the display panel in the above-mentioned embodiments, which will not be described in this embodiment in detail herein.

Pursuant to embodiments described above in the present application, these embodiments do not describe all the details in detail, nor limit the present application to only the described specific embodiments. Obviously, based on the above description, many modifications and changes can be made. The present specification selects and specifically describes these embodiments, in order to better explain the principle and practical application of the present application, so that those skilled in the art can make good use of the present application and a modified usage on the basis of the present application. The present specification is limited only by the claims and full scope and equivalents thereof.

What is claimed is:

1. A display panel comprising pixel circuits and light-emitting elements, wherein the pixel circuits comprise a first pixel circuit and a second pixel circuit, the light-emitting elements comprise a first light-emitting element and a second light-emitting element, and a light-emitting color of the first light-emitting element and a light-emitting color of the second light-emitting element are different;

the first pixel circuit comprises a first reset module, wherein the first reset module is connected to the first light-emitting element, and provides a first reset signal to the first light-emitting element under a condition that the first reset module is turned on;

the second pixel circuit comprises a second reset module, wherein the second reset module is connected to the second light-emitting element, and provides a second reset signal to the second light-emitting element under a condition that the second reset module is turned on;

a data writing period of the pixel circuits comprises a data writing phase and one or more holding phases;

at least one of the holding phases comprises a first reset sub-phase, wherein in the first reset sub-phase, the first reset module and the second reset module are turned on, a voltage of the first reset signal is Vref21, a voltage of the second reset signal is Vref22, and Vref21≠Vref22.

2. The display panel of claim 1, wherein the first light-emitting element emits green light, the second light-emitting element emits blue light or red light, and Vref21>Vref22.

3. The display panel of claim 1, wherein an equivalent capacitance of the first light-emitting element is larger than an equivalent capacitance of the second light-emitting element, and Vref21>Vref22.

4. The display panel of claim 1, wherein the pixel circuits further comprise a third pixel circuit, the light-emitting elements further comprise a third light-emitting element, and the light-emitting color of the first light-emitting element, the light-emitting color of the second light-emitting element and a light-emitting color of the third light-emitting element are all different;

the third pixel circuit comprises a third reset module, wherein the third reset module is connected to the third light-emitting element, and provides a third reset signal to the third light-emitting element under a condition that the third reset module is turned on;

in the first reset sub-phase, the third reset module is turned on, and a voltage of the third reset signal is Vref23;

Vref21≠Vref23, and Vref22≠Vref23.

5. The display panel of claim 4, wherein the first light-emitting element emits green light, the second light-emitting element emits blue light, and the third light-emitting element emits red light;

Vref21>Vref22>Vref23.

6. The display panel of claim 4, wherein

|Vref21−Vref22|>|Vref22−Vref23|.

7. The display panel of claim 1, wherein the first pixel circuit further comprises a fourth reset module and a first drive module, wherein the fourth reset module is connected to the first drive module, and provides the first reset signal to the first drive module under a condition that the fourth reset module is turned on;

the second pixel circuit further comprises a fifth reset module and a second drive module, wherein the fifth reset module is connected to the second drive module, and provides the second reset signal to the second drive module under a condition that the fifth reset module is turned on;

the data writing phase comprises a second reset sub-phase, wherein in the second reset sub-phase, the first reset module and the second reset module are turned on, the voltage of the first reset signal is Vref11, the voltage of the second reset signal is Vref12, and Vref11=Vref12.

8. The display panel of claim 7, wherein the pixel circuits further comprise a third pixel circuit, the light-emitting elements further comprise a third light-emitting element, and the light-emitting color of the first light-emitting element, the light-emitting color of the second light-emitting element and a light-emitting color of the third light-emitting element are all different;

the third pixel circuit comprises a third reset module, a sixth reset module and a third drive module, wherein the third reset module is connected to the third light-emitting element, and provides a third reset signal to the third light-emitting element under a condition that the third reset module is turned on, and the sixth reset module is connected to the third drive module, and provides the third reset signal to the third drive module under a condition that the sixth reset module is turned on;

in the second reset sub-phase, the third reset module is turned on, a voltage of the third reset signal is Vref13, and Vref11=Vref12=Vref13;

in the first reset sub-phase, the third reset module is turned on, the voltage of the third reset signal is Vref23, and Vref21>Vref22>Vref23.

9. The display panel of claim 8, wherein

Vref11>Vref21; and/or

Vref13<Vref23.

10. The display panel of claim 8, wherein

Vref11<Vref21, and Vref11>Vref22.

11. The display panel of claim 8, wherein one of Vref21, Vref22, Vref23 is equal to Vref11.

12. The display panel of claim 1, wherein the first pixel circuit further comprises a fourth reset module and a first drive module, wherein the fourth reset module is connected to the first drive module, and provides a fourth reset signal to the first drive module under a condition that the fourth reset module is turned on;

the second pixel circuit further comprises a fifth reset module and a second drive module, wherein the fifth reset module is connected to the second drive module, and provides a fifth reset signal to the second drive module under a condition that the fifth reset module is turned on;

the data writing phase comprises a second reset sub-phase, wherein in the second reset sub-phase, the first reset module and the second reset module are turned on, the voltage of the first reset signal is Vref11, the voltage of the second reset signal is Vref12, and Vref11≠Vref12.

13. The display panel of claim 12, wherein the first light-emitting element emits green light, and the second light-emitting element emits blue light or red light, Vref21>Vref22, and Vref11>Vref12.

14. The display panel of claim 12, wherein an equivalent capacitance of the first light-emitting element is larger than an equivalent capacitance of the second light-emitting element, Vref21>Vref22, and Vref11>Vref12.

15. The display panel of claim 12, wherein the pixel circuits further comprise a third pixel circuit, the light-emitting elements further comprise a third light-emitting element, and the light-emitting color of the first light-emitting element, the light-emitting color of the second light-emitting element and a light-emitting color of the third light-emitting element are all different;

the third pixel circuit comprises a third reset module, a sixth reset module and a third drive module, wherein the third reset module is connected to the third light-emitting element, and provides a third reset signal to the third light-emitting element under a condition that the third reset module is turned on, and the sixth reset module is connected to the third drive module, and provides a sixth reset signal to the third drive module under a condition that the sixth reset module is turned on;

in the second reset sub-phase, the third reset module is turned on, and a voltage of the third reset signal is Vref13, and in the first reset sub-phase, the third reset module is turned on, and the voltage of the third reset signal is Vref23;

Vref21>Vref22>Vref23, and Vref11>Vref12>Vref13.

16. The display panel of claim 15, wherein

|Vref11−Vref12|>|Vref12−Vref13|.

17. The display panel of claim 15, wherein $$Vref21 = Vref11; \text{and/or}$$

$$Vref22 = Vref12; \text{and/or}$$

$$Vref23 = Vref13.$$

18. The display panel of claim 1, wherein the pixel circuits further comprise a third pixel circuit, the light-emitting elements further comprise a third light-emitting element, and the light-emitting color of the first light-emitting element, the light-emitting color of the second light-emitting element and a light-emitting color of the third light-emitting element are all different;

the third pixel circuit comprises a third reset module, wherein the third reset module is connected to the third light-emitting element, and provides a third reset signal to the third light-emitting element under a condition that the third reset module is turned on;

in the first reset sub-phase, the third reset module is turned on, and a voltage of the third reset signal is Vref23;

Vref22=Vref23.

19. The display panel of claim 18, wherein the data writing phase comprises a second reset sub-phase, wherein in the second reset sub-phase, the first reset module, the second reset module and the third reset module are turned on, the voltage of the first reset signal is Vref11, the voltage of the second reset signal is Vref12, and the voltage of the third reset signal is Vref13;

Vref11=Vref12=Vref13=Vref22=Vref23.

20. The display panel of claim 1, wherein the display panel comprises N rows of the pixel circuits, a plurality of the first reset modules in the N rows of the pixel circuits are connected to a same first reset signal terminal, a plurality of the second reset modules in the N rows of the pixel circuits are connected to a same second reset signal terminal, the first reset signal terminal provides the first reset signal, and the second reset signal terminal provides the second reset signal;

time of one frame picture of the display panel comprises a first time period and a second time period, wherein the first time period comprises the data writing phase of each row of the pixel circuits, and an operation process of each row of the pixel circuits during the second time period comprises at least one first reset sub-phase.

* * * * *